United States Patent [19]

Crutchfield et al.

[11] 4,303,777
[45] Dec. 1, 1981

[54] ACETAL CARBOXYLIC ACID POLYMERS

[75] Inventors: Marvin M. Crutchfield; David R. Dyroff, both of Creve Coeur, Mo.

[73] Assignee: Monsanto Company, St. Louis, Mo.

[21] Appl. No.: 156,704

[22] Filed: Jun. 5, 1980

[51] Int. Cl.³ .......................... C08G 6/00; C08L 61/02
[52] U.S. Cl. .................................... 525/398; 525/400; 525/403; 528/232; 528/239; 528/243; 528/245; 528/270
[58] Field of Search ...................... 525/398, 400, 403; 528/232, 239, 243, 245, 270

[56] References Cited

U.S. PATENT DOCUMENTS 4,144,226  3/1979  Crutchfield et al. ............... 528/231
4,204,052  5/1980  Crutchfield et al. ............... 525/398

*Primary Examiner*—Lucille M. Phynes
*Attorney, Agent, or Firm*—S. M. Tarter; W. H. Duffey; R. C. Griesbauer

[57] ABSTRACT

A polymer having the average structure:

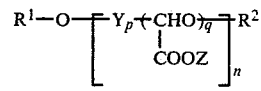

wherein Y is a moiety containing 1 to about 20 carbon atoms randomly distributed along the polymer chain derived from a comonomer selected from the group consisting of aldehydes and epoxy compounds; p is 0 or 1; the product of q and n averages at least 4; $R^1$ and $R^2$ are individually any chemically stable group which stabilizes the polymer against rapid depolymerization in alkaline solution; and Z is a mixture of H and members selected from the group consisting of alkali metals, ammonium and alkanol amine groups having from 1 to about 4 carbon atoms, is useful for the reversible deflocculation of clay slurries. In the preferred embodiments, p is 0 to provide a homopolymer, the product of q and n averages between about 10 and about 200, and Z is a mixture containing at least 1 percent H, the remainder being alkali metal, e.g., sodium.

9 Claims, No Drawings

ACETAL CARBOXYLIC ACID POLYMERS

BACKGROUND OF THE INVENTION

This invention relates to polymeric acetal carboxylic acids and acid salts and mixtures of either of these with the corresponding salts which are useful for the reversible deflocculation of clay slurries.

Clays are generally considered to be a group of aluminosilicate minerals of varying crystallinity which naturally occur as plastic, soft, variously colored earths. In many clays, about 30 percent by weight of the solid particles have a diameter less than about 0.002 millimeters. Such clays are widely used for the manufacture of ceramics for industrial and domestic uses. Of the various clays, typical examples include kaolin, montmorillonite, halloysite, bentonite and the like.

In the mining of various clays, such as kaolin, the clay is contacted with water and a small amount of a deflocculating agent, such as tetraalkali metal pyrophosphate, alkali metal tripolyphosphate and the like, to form a thin slurry of the clay in water. The slurry can be thickened again by reducing the pH to cause the clay to reflocculate.

Although satisfactory results are achieved by the prior art processes, it has now been found that clays can be deflocculated by the acetal carboxylic acid polymers of the present invention to produce thin slurries, which will reflocculate without further treatment after a time interval which time can be controlled by the proper selection of the initial pH and the end groups at the termini of the acetal carboxylic acid polymers. Such use of acetal carboxylic acid polymers for the reversible deflocculation of clays is fully described in copending application Ser. No. 156,703, filed June 5, 1980.

The salt forms of polymeric acetal carboxylates were described in U.S. Pat. No. 4,144,226 issued Mar. 13, 1979, and the salt forms can be the precursors to the acetal carboxylic acid polymers of the present invention. Formerly it was believed that such partially or completely acidified polymers in an aqueous environment would hydrolyze so rapidly that the acids and acid salts would have no more than a fleeting existence and would have no apparent utility.

Now it has been surprisingly found that the hydrolytic stability of the acids and acid salts can be sufficiently controlled by the selection of end groups at the polymer termini so that the polymers can have a significantly long lifetime for useful applications, e.g., in reversible deflocculation of clay slurries. The method for controlling the hydrolytic stability of acetal carboxylate polymers is fully described in copending application Ser. No. 156,706, filed June 5, 1980.

According to the present invention, acetal carboxylic acid polymers are provided which have sufficient hydrolytic stability to be useful for the reversible deflocculation of clay slurries over significantly long time periods. Since such slurries reflocculate as the polymers of the present invention hydrolyze at a controlled rate, there is no need to readjust the pH of the deflocculated clay slurry to initiate reflocculation. Thus it will be seen by those skilled in the art that a significant improvement has been made in the deflocculation and reflocculation of clay slurries using the polymers of the present invention.

SUMMARY OF THE INVENTION

These and other advantages are achieved by a polymer having the average structure:

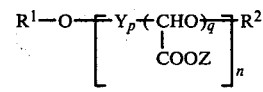

wherein Y is a moiety derived from a comonomer containing 1 to about 20 carbon atoms randomly distributed along the polymer chain, the comonomer being selected from the group consisting of aldehydes and epoxy compounds; p is 0 or 1; the product of q and n averages at least 4; $R^1$ and $R^2$ are individually any chemically stable group which stabilizes the polymer against rapid depolymerization alkaline solution; and Z is a mixture of H and members selected from the group consisting of alkali metals, ammonium and alkanol amine groups having from 1 to about 4 carbon atoms.

For the purposes of this invention, the term "rapid depolymerization in alkaline solution" as it is used in the specification and claims shall mean that in an aqueous solution of 0.5 molar sodium hydroxide containing 10 grams per liter of the acetal carboxylate polymer precursor to the polymer of the present invention, the average chain length of the acetal carboxylate polymer will be reduced by more than 50 percent, as determined by Proton Magnetic Resonance, after 1 hour at 20° C. The term "acetal carboxylic acid polymers" shall mean polymeric acetal carboxylic acids and acid salts, and mixtures of either of these with the corresponding alkali metal salts, all of which conform to the average structure described above. Hence, it is not necessary for every polymer chain in the above formula to contain one or more carboxylate groups bearing H. In fact, the average number of —COOH groups per polymer chain may be substantially less than one. In aqueous solution of —COOH groups are in dynamic equilibrium with carboxylate groups in all of the polymer chains, and only the average number of —COOH groups per chain is significant in determining the fate of all of the polymer chains present.

Broadly described, the acetal carboxylate polymer useful as a precursor to prepare the polymer of the present invention can be prepared according to the teachings of U.S. Pat. No. 4,144,226 issued Mar. 13, 1979. The polymer precursor is prepared by bringing together under polymerization conditions a glyoxylate ester and a polymerization initiator and adding to the termini of the resulting polymer a chemically stable group to stabilize the polymer against rapid depolymerization in alkaline solution. To prepare the polymer salt, the stabilized polymer can be saponified with an alkali metal hydroxide to form the corresponding alkali metal salt. The alkali metal salt can be converted to the ammonium or alkanol amine salt by conventional ion exchange techniques.

The acetal carboxylate polymer precursor can also contain other polymer fragments and accordingly the polymer precursor can be a linear homopolymer or copolymer or it can be branched. To form a copolymer precursor the glyoxylate ester is polymerized with any number of comonomers known to those skilled in the art. It is only necessary that the comonomer does not cause the acetal carboxylate polymer precursor to depolymerize in alkaline solution. Suitable comonomers include: epoxy compounds, such as ethylene oxide, propylene oxide, epihaloydrin, epoxy succinate and the like; and aldehydes containing from 1 to about 20 carbon atoms, such as formaldehyde, acetaldehyde, steric aldehyde and the like. Of the numerous comonomers that can be polymerized with the glyoxylate ester, aldehydes are preferred and formaldehyde is especially preferred.

It is important that a sufficient number of acetal carboxylate segments are available to effectively deflocculate the clay. It has been found that when the product of n and q averages less than about 4, effective deflocculation is difficult to achieve. On the other hand, when the product of q and n is greater than 4 but the ratio of q to p is less than about 1, defloccculation is also less effective. It is preferred that the ratio of q to p averages at least 1, and the product of n and q averages between about 10 and about 200 and it is even more preferred that the product of n and q averages between about 50 and about 100. However, when the product of n and q is greater than about 200, a significant increase in defloccculation is not seen although higher values can be used.

A preferred polymer for use in the reversible defloccculation of clay slurries is a homopolymer (i.e., wherein p is 0). Thus, there is then provided a polymer having the general formula:

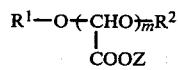

wherein m averages at least 4 and $R^1$, $R^2$ and Z are as described above. For the reasons set forth above, m preferably should average between about 10 and about 200, more preferably between about 50 and 100.

Any number of chemically reactive groups can be added to the polymer termini to provide end groups, which can be alike or different in the polymer structure, to stabilize the polymer against rapid depolymerization in an alkaline solution. It is only necessary that the chemically reactive group stabilizes the acetal carboxylate polymer against rapid depolymerization in an alkaline solution, and except for its effect on hydrolytic stability, the specific nature of the chemically reactive group is not important in the proper function of the polymer in its intended use. As an example, suitable chemically stable end groups include stable substituent moieties derived from otherwise stable compounds such as: alkanes, such as methane, ethane, propane, butane and higher alkanes such as decane, dodecane, octadecane and the like; alkenes such as ethylene, propylene, butylene, decane, dodecane and the like; branched chain hydrocarbons, both saturated and unsaturated, such as 2-methyl butane, 2-methyl butene, 4-butyl-2,3-dimethyl octane and the like; aromatic hydrocarbons such as benzene, toluene, xylene and the like; cycloalkanes and cycloalkenes such as cyclohexane and cyclohexene and the like; alcohols such as methanol, ethanol, 2-propanol, cyclohexanol, and the like; polyhydric alcohols such as 1,2-ethane diol, 1,4-benzene diol and the like; ethers such as methoxyethane methyl ether, ethyl ether, ethoxy propane and cyclic ethers such as ethylene oxide, epichlorohydrin, tetramethylene oxide and the like. The above listing is intended to be instructive and is not intended to be limiting since other chemically stable end groups that stabilize the polymer against rapid depolymerization in an alkaline solution will occur to those skilled in the art.

The selection of the end group is important in the method of the present invention since the end group structure has a major effect on the hydrolytic stability of the polymer, and thus, on the duration of reversible defloccculation of clay at any given pH. Substantial variations in hydrolytic stability of the polymer can be achieved by rather modest variations in the structure of the end group. The structure of any end group can be expressed in the following form:

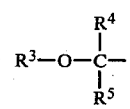

wherein $R^4$ and $R^5$ are the substituents on the acetal carbon nearest the corresponding terminus of the stabilized polymer and $R^3$ is a moiety representing the remainder of the end group. For example, when $R^5$ is H, the relative stability of each end group in the polymer structure at a given pH can be predicted using the sigma value of the substituent $R^4$. The Hammet or Taft substituent constants (i.e., sigma values) of representative groups can be found in many physical chemistry textbooks. Among several different acetal carboxylate polymers, the order of hydrolytic stability will tend to be such that the one with end groups in which the substituents $R^4$ have the most negative substituent constants (sigma values) will hydrolyze fastest, and the polymer with end groups in which the substituents $R^4$ have the most positive sigma values will hydrolyze slowest. When $R^5$ is not H, the relative hydrolytic stability of each end group, and hence of the polymer, can be similarly controlled by selecting substituents $R^4$ of varying Hammet-Sigma values such that the sigma value is greater (more positive) as the desired hydrolytic stability increases.

The relative hydrolytic stability can best be illustrated using polymers stabilized with different end group structures, wherein $R^5$ in all cases is H. When the polymer is stabilized by end groups derived from dialkyl sulfate, $R^3$ is alkyl, preferably 1 to about 4 carbon atoms, and $R^4$ is —COOM. When the polymer is stabilized using an end group derived from methyl or ethyl vinyl ether, $R^3$ is methyl or ethyl and $R^4$ is methyl. When the end group is derived from dimethoxymethane, $R^3$ is methyl and $R^4$ is hydrogen.

These acetal carboxylate polymer and groups are listed in Table 1 in order of decreasing hydrolytic stability. The Hammet-Sigma functions ($\sigma_p$) were obtained from J. March, "Advanced Organic Chemistry", McGraw-Hill Book Company, New York, N.Y. (1968), page 241.

TABLE 1
HYDROLYTIC STABILITY AS A FUNCTION OF SIGMA VALUE

| END GROUP | $R^4$ | $R^3$ | $R^4\sigma_p$ | RELATIVE HYDROLYSIS RATE |
|---|---|---|---|---|
| $-\underset{\underset{COONa}{\vert}}{\overset{H}{C}}-O-CH_3$ | $-COONa$ | $-CH_3$ | 0.13 | ~1 |
| $-\underset{\underset{COONa}{\vert}}{\overset{H}{C}}-O-CH_2CH_3$ | $-COONa$ | $-C_2H_5$ | 0.13 | ~1 |
| $-\underset{\underset{COONa}{\vert}}{\overset{H}{C}}-O-(CH_2CH_2O)_{\overline{n=3}}H$ | $-COONa$ | $-(CH_2CH_2O)_{\overline{n=3}}H$ | 0.13 | ~1 |
| $-\underset{\underset{H}{\vert}}{\overset{H}{C}}-O-CH_3$ | $-H$ | $-CH_3$ | 0 | ~3,000 |
| $-\underset{\underset{H}{\vert}}{\overset{H}{C}}-O-CH_2CH_3$ | $-H$ | $-C_2H_5$ | 0 | ~3,000 |
| $-\underset{\underset{CH_3}{\vert}}{\overset{H}{C}}-O-CH_3$ | $-CH_3$ | $-CH_3$ | −0.13 | ~20,000 |
| $-\underset{\underset{CH_3}{\vert}}{\overset{H}{C}}-O-CH_2CH_3$ | $-CH_3$ | $-C_2H_5$ | −0.13 | ~20,000 |

Note that by selection of end groups from those in Table 1, the hydrolysis rate at a given pH can be varied by a factor of 20,000. Still larger variations could be achieved by using substituents $R^4$ with sigma values not limited to the range −0.13 to +0.13, or by varying the choice of both $R^4$ and $R^5$ in such a way that $R^4$ and $R^5$ are more electron withdrawing as the hydrolysis rate decreases.

In order to be useful as a precursor to prepare the acetal carboxylic acid polymer of the present invention, the acetal carboxylate polymer precursor must be stabilized against rapid depolymerization in alkaline solution. For example, the polymer is not stable against depolymerization in aklaline solution when $R^4$ is —COOM and $R^3$ is hydrogen.

The corresponding polymer ester can be saponified with an alkali metal hydroxide to form the alkali metal salt precursor to the polymer of the present invention. The alkali metal salt can be converted to the ammonium or alkanol amine salt by conventional ion exchange techniques. To prepare the polymer of the present invention from the polymer precursor, it is only necessary to reduce the pH of the polymer to an appropriate level to replace some of the alkali metal, ammonium or alkanol amine groups with hydrogen. Thus, there is provided a polymer which contains a mixture of —COOH groups and carboxylate groups, the counter ions of the carboxylate groups being selected from the group consisting of hydrogen ions, alkali metals, ammonium and alkanol amine groups having from 1 to about 4 carbon atoms.

When a stabilized ester polymer has been saponified to the corresponding alkali metal salt, substantially all of the carboxylate groups are quantitatively converted from the ester to the alkali metal salt. Using conventional ion exchange techniques, the alkali metal salt can be converted to the ammonium salt or the alkanol amine salt having from 1 to about 4 carbon atoms, or even to the acid form. If the pH of a polymer salt solution is reduced, some of the carboxylate anions are sequentially associated with hydrogen ion to form a —COOH group. Conversely, if the pH of the acetal carboxylic acid polymer is increased, some of the —COOH groups will be sequentially neutralized to carboxylate anions, —COO⁻.

The following table illustrates the relationship between the pH of a 0.28 weight percent aqueous solution of an acetal carboxylic acid homopolymer having an average chain length of about 100 repeating units as a function of the percent neutralization with sodium hydroxide. The percent neutralization is zero when no sodium hydroxide has been added to the acetal carboxylic acid polymer and 100 percent neutralized when one mole of sodium hydroxide has been added per mole of —COOH present. To remove substantially all of the hydrogens from the —COOH groups requires a percent neutralization greater than 100 percent since a —COOH group in a highly neutralized acetal carboxylic acid salt is a very weak acid.

| pH | % Neutralized |
|---|---|
| 2 | 0 |
| 3 | 38 |
| 4 | 62 |
| 5 | 81 |
| 6 | 94 |
| 7 | 98 |
| 8 | 99 |
| 9 | 101 |
| 10 | 103 |
| 11 | 110 |

The term "acetal carboxylic acid polymer" has been defined above as meaning the pure acid, acid salts, and mixtures of either of these with the corresponding salts. The term "acid salt" as it applies to such polymers means that at least one, but not all, of the —COOZ groups are —COOH. The term "pure acid" applies when all of the —COOZ groups are —COOH. By a mixture of an acid or acid salt with a salt, we mean a mixture of such polymer chains in which a significant fraction of the total —COOZ groups present are —COOH, but at least one chain is present, on the average, in which none of the —COOZ groups are —COOH. The fraction of the total assembly of —COOZ groups which is —COOH is considered significant when it is at least about 0.01 mole percent. The significance of the —COOH groups is even greater at a level of about 0.1 mole percent, and very great at a level of about 1 mole percent or more. At the 1 mole percent level the solution pH is about 8, which has been found to be too low in most cases for adequate stability for detergent applications in which the selected end groups should preferably provide a rapid rate of depolymerization and biodegradation in the environment. Finally, to have a pH below 7, it is only necessary to have Z consist of more than about 2 mole percent H.

For deflocculation applications an end group having greater resistance to hydrolysis can be used to provide an acetal carboxylic acid polymer with greater survival times even at lower pH. For example, when $R^4$ is —COOZ and $R^3$ is methyl at a pH of about 6, in which case about 6 mole percent of the —COOZ groups are —COOH, the acetal carboxylic acid polymer of the present invention will rapidly deflocculate a kaolin slurry having a consistency of mayonnaise to a pumpable liquid slurry. The surviving acetal carboxylic acid polymer will remain at a sufficiently high level for up to 23 days at this pH to preserve the deflocculated state of the kaolin slurry. Therefore, the pumpable liquid slurry containing the deflocculated kaolin will spontaneously return to its thickened state, indicating that the acetal carboxylate polymer has substantially depolymerized. The optimum percentages of carboxylic acid groups in the polymer of the present invention as well as the selection of the acetals at the polymer termini can be determined for any other time interval under various conditions by routine experimentation by those skilled in the art in light of the present disclosure.

The concentration of the acetal carboxylic acid polymer useful for the defloccutation of clay slurries can vary within wide limits. For example, as little as 0.01 percent of the polymer, based on the weight of the dry clay, is sufficient to reversibly deflocculate the clay. It is preferred to use between about 0.03 percent and about 0.3 percent, based on the weight of the dry clay. The time of deflocculation can also be varied to some degree by the concentration of the polymer and greater quantities can be added for longer deflocculation times if desired.

DESCRIPTION OF THE PREFERRED EMBODIMENTS

This invention is illustrated by, but not limited to, the following Examples wherein all percentages are by weight unless otherwise indicated.

EXAMPLE I

A. Preparation of Methyl Glyoxylate

A 2-liter, 4-necked, round bottom flask equipped with an overhead stirrer, thermometer and 30 centimeter Vigreaux column and take-off head is charged with 1200 grams (10 moles) of methyl glyoxylate methyl hemiacetal. A total of 568 grams of phosphorus pentoxide (4 moles) is added in 4–6 portions keeping the reaction temperature below 90° C. The addition requires about 90 minutes. When the addition is complete, the mixture is stirred until the temperature has fallen to about 70° C. (0.5 hour). The mixture is distilled at aspirator vacuum (20–40 torr) yielding 764 grams crude methyl glyoxylate having a boiling point of 56°–61° C. The distillation is stopped when the pot temperature reaches 125°C. since a violent decomposition may occur at higher temperatures. Chromatographic analysis of this crude material indicates 86.6 percent glyoxylate, 9.3 percent methyl dimethoxy acetate, 3.3 percent dimethyl oxalate, and trace amounts of unidentified products.

The crude product is then distilled from 25 grams of 3A molecular sieves which had been heated to about 250° C. to drive off residual moisture and organics, through the Vigreaux column. A 15-gram forecut of about 97 percent pure glyoxylate is collected initially. The Vigreaux column is replaced by a 30 centimeter Widmer column and 521 grams of 99 percent pure polymerizable grade methyl glyoxylate are collected having a boiling point of 83°–84° C. at 210 torr. A final cut of 36 grams (93 percent pure) ester is collected in a final fraction (91°–94° L C.; 210 torr). The overall yield of polymerizable glyoxylate is 59 percent from the hemiacetal.

B. Preparation of Polymer

To a 200 milliliter, 3-necked, round bottom flask equipped with an efficient stirrer and thermometer were added 36 grams of glyoxylate ester from Section A above (0.4 mole) and 9 milliliters of methylene chloride. The mixture was cooled to about 0° C. and then 300 microliters of 0.05 molar sodio dimethyl methyl malonate in tetrahydrofuran were added. The temperature rose to about 33° C. The mixture was cooled to 0° C. and stirred at that temperature for about 1 hour. Then, 5-gram portions were taken and separately stabilized using a variety of chemically stable end groups. The reagents to provide the chemically stable end groups and the identification of the end groups are shown in Table 2. In all cases, the temperature at the beginning of adding the reagent was maintained at 0° C. and the resulting polymer had a chain length of about 50 repeating units.

TABLE 2

| REAGENT | $R^1$ | $R^2$ |
|---|---|---|
| $CF_3COOH$ + Ethyl Vinyl Ether | H<br>$CH_3C-$<br>$\|$<br>$OCH_2CH_3$ | H<br>$-C-CH_3$<br>$\|$<br>$OCH_2CH_3$ |
| NaH + Dimethyl Sulfate | H<br>$H_3CO-C$<br>$\|$<br>COONa | H<br>$-C-OCH_3$<br>$\|$<br>COONa |
| $P_2O_5$ + Dimethoxymethane | $H_3C-O-CH_2-$ | $-CH_2-O-CH_3$ |

C. Saponification

Each of the polymers in Section B was poured into about 30 milliliters of 2 molar sodium hydroxide and stirred for about 5 minutes. Each mixture was washed 3 times with saturated sodium bicarbonate solution. Then there were added with cooling and stirring about 13 milliliters of 10 normal NaOH solution. Each mixture was stirred for two hours and then about 20 milliliters of methanol were added. The solutions were stirred for about 30 minutes and a precipitate was collected on a sintered glass funnel. Each precipitate was washed twice with methanol and twice with diethyl ether and dried for one hour on the sintered glass funnel using aspirator vacuum.

EXAMPLE II

A 300 milligram sample of the sodium form of an acetal carboxylate polymer with a chain length of about 100 repeating units was titrated using a Methrohm automatic titrator. To the 300 milligram sample, 2.0 milliliters of 0.50 normal sodium hydroxide and 100 milliliters of water were added before the titration began. The resulting solution was titrated at 25° C. using 0.5 normal hydrochloric acid. The results are presented in Table 3.

TABLE 3
MOLE PERCENT CARBOXYLATE GROUPS NEUTRALIZED AS A FUNCTION OF pH

| pH | % Neutralized |
|----|---------------|
| 2  | 0             |
| 3  | 38            |
| 4  | 62            |
| 5  | 81            |
| 6  | 94            |
| 7  | 98            |
| 8  | 99            |
| 9  | 101           |
| 10 | 103           |
| 11 | 110           |

These results give some indication of the mole percentage of —COOZ groups which are —COOH as a function of pH.

EXAMPLE III

Three hundred milligram samples of the vinyl ether and dimethyl sulfate endcapped polymers prepared in Example I were dissolved in 100 milliliter portions of water, cooled to about 0° C., passed through a strong cation exchange resin column in the acid form (Dowex 50X4, available commercially frm Dow Chemical Company, Midland, Mich.) and the effluent from the column was collected. An aliquot from each sample was titrated with standardized sodium hydroxide solution and the results indicated that substantially all of the carboxylate groups had been converted to carboxylic acid. The rate of depolymerization of each acid at pH 2 and 5°–10° C. was determined by checking the chelating capacity of aged aliquots compared to the original salt using calcium ion titration with an Orion electrode at pH 8.

The results of the calcium ion titration indicated that about 15 percent of the vinyl ether endcapped polymer remained after 10 minutes in the acid form. The acid polymer endcapped with dimethyl sulfate was virtually unchanged even after 5 hours.

EXAMPLE IV

Each of the acetal carboxylate polymers prepared in Example I was tested as a deflocculant for a viscous kaolin slurry by mixing 0.1 gram of the acetal carboxylate polymer with 100 grams of the kaolin slurry having a pH of about 6. In each case, the acetal carboxylate polymer deflocculated the kaolin as indicated by a dramatic change in viscosity from a thick gel to that of a pumpable slurry having a viscosity slightly higher than that of water. The kaolin remained deflocculated for a period of time, depending upon the hydrolytic stability of the acetal carboxylate polymer. When the polymer had sufficiently depolymerized, the pumpable slurry rapidly converted back to the flocculated state. The time that the kaolin remained deflocculated at 25° C. was measured and compared to the end group on the acetal carboxylate polymer. At pH 6 about 6 percent of the carboxylate groups are acid. The results are presented in Table 4.

TABLE 4
KAOLIN DEFLOCCULATION TIME AT 25° C. AS A FUNCTION OF END GROUP STRUCTURE AT pH 6

| Polymer End Group | Kaolin Defloc-culation Time |
|-------------------|-----------------------------|
| H | 2 minutes |
| $-\underset{\underset{CH_3}{\mid}}{C}-OC_2H_5$ | |
| $-CH_2-OCH_3$ | 4 days |
| $-\underset{\underset{COONa}{\mid}}{CH}-OCH_3$ | 23 days |

Although the invention has been described in terms of specified embodiments which are set forth in considerable detail, it should be understood that this is by way of illustration only and that the invention is not necessarily limited thereto since alternative embodiments and operating techniques will become apparent to those skilled in the art in view of the disclosure. Accordingly, modifications are contemplated which can be made without departing from the spirit of the described invention.

What is claimed is:

1. A polymer having the average structure:

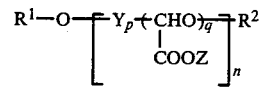

wherein Y is a moiety derived from a comonomer containing 1 to about 20 carbon atoms randomly distributed along the polymer chain, the comonomer being selected from the group consisting of aldehydes and epoxy compounds; p is 0 or 1; the product of q and n averages at least 4; $R^1$ and $R_2$ are individually any chemically stable group which stabilizes the polymer against rapid depolymerization in alkaline solution; and Z is a mixture of H and members selected from the group consisting of alkali metals, ammonium and alkanol amine groups having from 1 to about 4 carbon atoms.

2. A polymer of claim 1 wherein Z is at least 0.01 mole percent H.

3. A polymer of claim 1 wherein Z is at least 0.1 mole percent H.

4. A polymer of claim 1 wherein Z is at least 1 mole percent H.

5. A polymer of claim 1 wherein Z is at least 2 mole percent H.

6. A polymer of claim 1, 2, 3, 4 or 5 wherein the product of q and n averages between about 10 and about 200, and the ratio of q to p averages at least 1.

7. A polymer of claim 1, 2, 3, 4 or 5 wherein p is 0.

8. A polymer of claim 1, 2, 3, 4, or 5 wherein p is 0, and the product of q and n averages between about 10 and about 200.

9. A polymer of claim 1, 2, 3, 4 or 5 wherein p is 0, Z is a mixture of H and sodium the product of q and n averages between about 10 and about 200, and $R^1$ and $R^2$ can be represented by the structure:

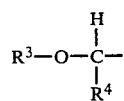
wherein $R^3$ is alkyl having 1 to about 4 carbon atoms or $H-(OCH_2CH_2)_{1-3}$, and $R^4$ is selected from the group consisting of $-COONa$, $-H$ and $CH_3$.
* * * * *